United States Patent [19]
Keser et al.

[11] 3,800,894
[45] Apr. 2, 1974

[54] DEVICE FOR GRAVIMETRICALLY UNIFORMLY FEEDING OF COMPONENTS TO A MIXING DEVICE

[75] Inventors: Fridolin Keser, Hemmingen; Ralf Urban, Hirschlanden, both of Germany

[73] Assignee: Werner & Pfleiderer, Stuttgart-Feuerbach, Germany

[22] Filed: Aug. 1, 1973

[21] Appl. No.: 384,493

[30] Foreign Application Priority Data
Sept. 8, 1972 Germany............................ 2244059

[52] U.S. Cl..................... 177/64, 177/80, 177/119, 83/73, 83/77, 83/79, 83/358, 83/359
[51] Int. Cl. ... G01g 13/00, G01g 13/02, B26d 7/00
[58] Field of Search ............... 177/1, 63, 64, 66, 80, 177/119; 83/73, 77, 79, 358, 359

[56] References Cited
UNITED STATES PATENTS
| | | | |
|---|---|---|---|
| 2,571,976 | 10/1951 | Ward | 83/77 UX |
| 3,379,233 | 4/1968 | Kasper | 83/77 X |
| 3,379,234 | 4/1968 | Kasper | 83/77 X |
| 3,732,761 | 5/1973 | Sanders | 83/73 X |

Primary Examiner—George H. Miller, Jr.
Attorney, Agent, or Firm—Hane, Baxley & Spiecens

[57] ABSTRACT

A device for controllably and uniformly feeding from the output of a source of an endless strip of material, according to weight requirements, sections of strips of the material to the input of a material utilizing device. The apparatus comprises a continuously moving conveyor band leading from the source of strip material to the input of the device. Controllably operating cutting means cut the endless strip and indicating means indicate the length of each section. Controllably operating gates prevent the passage of a section along the conveyor band and measuring means measure the weight of the sections on the conveyor band. A pulse counter responsive to the indicator and the measuring means count a number of pulses related to the length of a section for activating the cutting means to cut the endless strip and for activating the gate to block the passage of a section on the conveyor band for a period of time related to the weight as measured by the measuring means to control the space between sections.

7 Claims, 3 Drawing Figures

DEVICE FOR GRAVIMETRICALLY UNIFORMLY FEEDING OF COMPONENTS TO A MIXING DEVICE

The invention relates to a device for uniformly feeding components metered by weight to a mixing device and, more particularly, to a device for feeding pre-plasticized rubber base mixtures in the form of sections cut of endless strips or bands to the feed means of a screw extruder or other suitable mixing device in accordance with the receiving capacity of the extruder or other mixing device.

BACKGROUND

There are known devices of the general kind above-referred to which comprise a transport device, a cutting device to which the strip of the rubber base mixture is periodically fed for cutting a strip or band into sections and a conveyor type weighing device for measuring the weight of the strip or band sections which reach the weighing device per unit of time.

The continuously processing of complete or finished rubber mixtures in screw extruders is carried out by uniform addition of several mixing components into the processing machine. The addition of these additive components according to a specific formula requires an accurate metering. One of the mixing components is the rubber base mixture which, for technical reasons, is usually provided in the form of endless strips or bands which are fed to the feed means of the extruder or other mixing machine.

It is known when feeding in these strips or bands to stretch them for varying the quantity being fed.

It is also known to feed the rubber base mixture in the form of strip or band sections to a feed hopper which is probed by suitable devices so that the feed of the material is volumetrically controlled. Volumetric metering makes it difficult to maintain accurately maintenance of a formula selected in accordance with the additive components to be supplied, the more so as the components are initially provided on the basis of the weight proportions of the components.

It is also known to provide a uniform flow of the material in the form of discrete particles and to measure continuously the weight of the material conveyed on a conveying band-type weighing device. With such apparatus one can determine the flow capacity resulting from a measured conveying band loading and the conveying velocity. The conveying velocity is then controlled by a suitable control system related to the band loading. However, a satisfactory operation of this known device presupposes that material exclusively of freely flowing consistency is conveyed over the conveying band of the weighing device. Material which includes particles or pellets of widely different sizes or in chunk form when loaded on the conveying band of a weighing device inherently preclude the uniform flow of material on the conveying band of a weighing device.

THE INVENTION

It is a broad object of the invention to provide a novel and improved device of the general kind above-referred to with which it is possible to feed materials accurately metered according to weight to a mixing machine, such as a screw extruder, in accordance with a predetermined formula.

A more specific object of the invention is to provide a novel and improved device of the general kind above-referred to which permits a uniform feeding of a preliminarily plasticized rubber mixture in the form of a band or strip and also of rubber materials in the form of pellets or granules which are separately or jointly uniformly supplied to the feeding device of a screw extruder or other mixing machine.

SUMMARY OF THE INVENTION

The afore-pointed out objects, features and advantages and other objects, features and advantages which will be pointed out hereinafter are obtained by providing a continuously moving conveyor band for feeding the strip of material from a source of such material to the input of the screw extruder or other mixing machine. Prior to the input of the extruder, cutting means cut the strip into sections whose length is indicated by indicator means. Controllably operated gating means temporarily prevent the passage of a section on the conveyor band. Measuring means measure the weight of the sections on the conveyor band and pulse counter means responsive to the indicator means and the measuring means count a number of pulses related to the length of a section for activating the cutting means to cut the strip and activate the gating means to block the passage of a section on the conveyor band for a period of time related to the weight being measured by the measuring means, thereby controlling the spacing between the sections. As a result, the material is fed to the input of a screw extruder according to the weight requirements which, in turn, are determined by a formula defining the weight of material to be fed to the extruder.

According to one aspect of the invention, the extruder comprises means for indicating the beginning and end of a section of material moving along such conveyor band. The pulse counter means includes a counter and a source of first pulses of a given fixed repetition rate. The indicator means controls the counter so as to count the number of the first pulses from the source of pulses which occur between the indications of the beginning and the end, respectively, of each section. The measuring means include means for generating second pulses having a frequency related to the difference between a desired weight and the actual weight measured by the measuring means. Further means cause the counter to count an equivalent number of the second pulses so that the cutting means and the gating means operate during the period of time and second pulses are counted.

According to another aspect of the invention, the indicator means comprise means for indicating the beginning and the end of a section of material moving along the conveyor band and said pulse counter means, includes a reversible counter which counts in a forward direction in response to the indications of a beginning of a section and in reverse direction in response to the indicator of the end of a section. A pulse generator is connected to said conveyor band for generating a pulse for each given increment of travel of the conveyor band. The measuring means include means for controlling the velocity of travel of the conveyor band in accordance with the difference between a desired weight and the actual weight as measured by the measuring means.

The apparatus according to the invention permits a weight adjusted metering of band-shaped starting materials in the form of strips and uniformly feeding such metered starting material to the input of a screw extruder or other mixing machine. The either timely retarding or accelerating of the feed of starting material permits maintenance of the desired formula for finished mixture in accordance with the required weight proportions of the material. It further permits feed-in of the material to be added in accordance with the input capacity of the screw extruder or other mixing machine. As pointed out herein, the additive may be in the form of strip sections to be added to a rubber base mixture. The velocity of the conveyor band of the weighing device remains constant. The invention further provides that a change in the loading of the conveyor band can be effected in a comparatively simple manner by correspondingly varying the velocity of the conveyor band.

BRIEF DESCRIPTION OF THE DRAWING

In the accompanying drawing, several preferred embodiments of the invention are shown by way of illustration and not by way of limitation.

In the drawing.

DETAILED DESCRIPTION OF THE INVENTION

Figure 1:
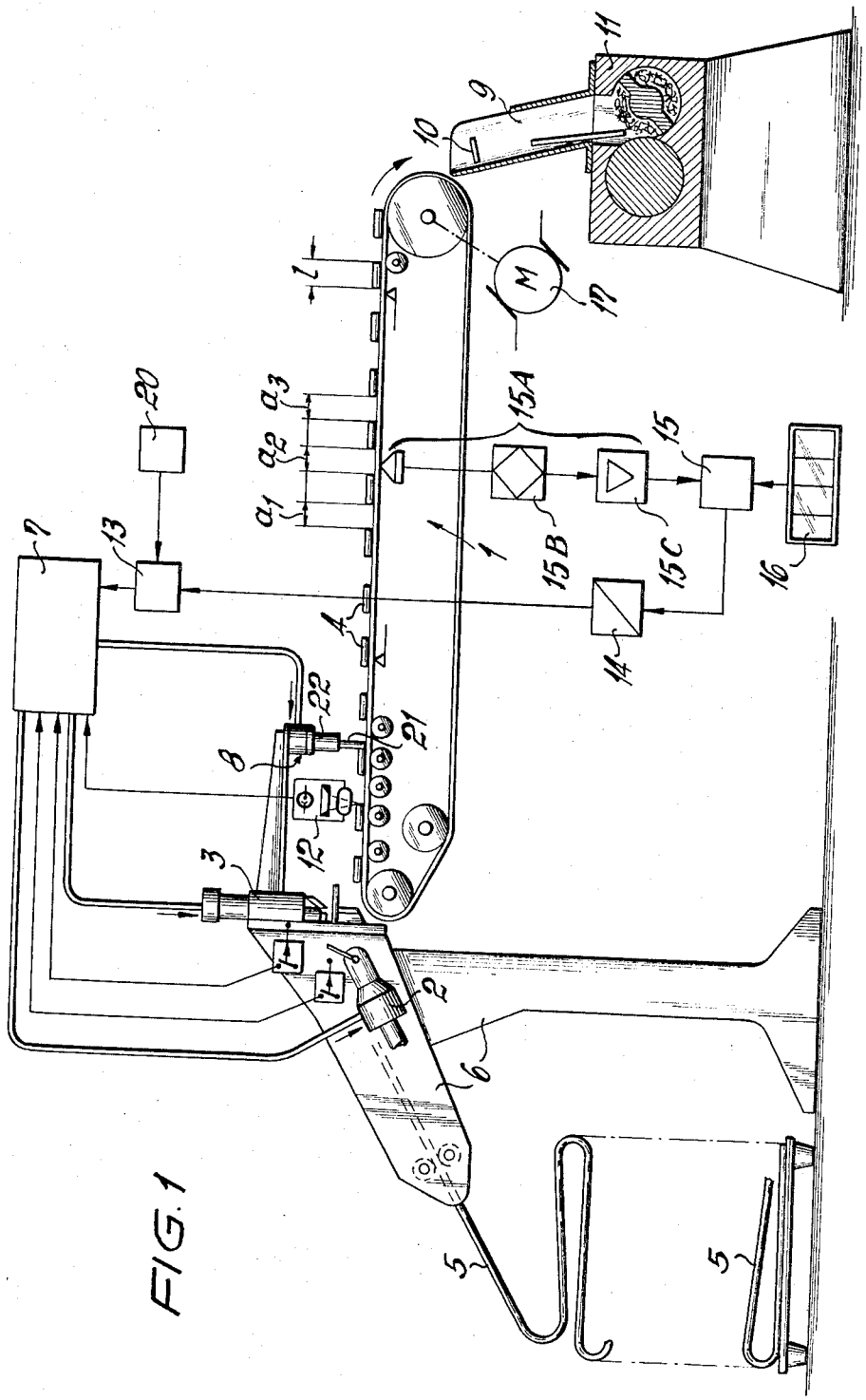
FIG. 1 shows diagrammatically an elevational view of an apparatus according to the invention including a conveying band-type weighing device, a feeding means, a cutting means and the required control means, wherein metering of strip sections to be fed is accomplished with a constant conveying band velocity by controlling the spacings between the strip sections.

The installation for metering by weight and feeding one or more components of material to a screw extruder is shown in FIG. 1 comprising a conveyor type weighing device, a feeding conveyor 2 for feeding band or strip-shaped materials 5 and a cutting device for cutting the band or strip-shaped materials into sections 4. A generally desk-shaped frame 6 mounting conveyor rollers is provided for feeding the band materials to cutting device 3. The device 6 also serves for supporting the conveying device 2 and the cutting device 3. The functions of both these devices are controlled in relation to each other by suitable control elements which will be more fully described hereinafter. The devices 2 and 3 are controlled so that conveying of the band of material by the conveying device occurs only when the cutting device is stopped and, conversely, the cutting device operates only when the conveying device is stopped.

A flow passage gate 8, fixedly mounted on the cutting device by means of a suitable bracket, coacts with the conveyor band of the weighing device. The gate 8 serves to maintain a suitable selected spacing $a_1$, $a_2$ or $a_3$ between the band or strip sections 4 as produced by the cutting device 3. It is controlled by a hereinafter more fully described control system and is periodically active. The gate comprises two fork-shaped spaced apart blocking bars 21 which are arranged crosswise to the conveyor band. These bars can be operated individually or together by suitable actuating means such as a pneumatically operated cylinder 22.

A discharge slide 9 is provided at the discharge end of the conveyor band and weighing device 1. The slide turns the sections of bands or strips entering the slide through 90° out of the direction of movement by means of a cross bar 10. The sections are then fed to the feed device of screw extruder 11 in such a position that they enter the feed device short edge first.

An electronic probe or detecting device 12 disposed above the path of the conveyor of the weighing device and in alignment with gate 8 (shown displaced in the drawing), indicates the beginning and end of the individual or paired arriving strip or band sections. The device can take many forms such as photodetectors and light sources wherein the transition from, say, reflectance to non-reflectance indicates the leading edge of a section while the opposite transition indicates the trailing edge of a section, or vice versa. In any event, one type or polarity of pulse can be generated for one edge and another type or polarity for the other edge. These pulses are used to initiate and terminate up counting in "up-down" or reversible pulse counter 13. The pulses counted during up or forward counting are from pulse generator 20 which generates pulses at a fixed known rate. Thus, the number of pulses accumulated during up counting is a measure of the length L of the section. The pulse associated with the trailing edge of the section initiates down or reverse counting by counter 13. However, for down counting, counter 13 accepts pulses from a variable frequency pulse source 14 such as a voltage controlled multivibrator which generates pulses having a repetition rate in accordance with the magnitude of an input control voltage. The control voltage is actually an "error" or difference voltage from difference detector 15. One input to the difference detector 15 is weighting means 15A including a weighing transducer 15B and an amplifier 15C for generating a voltage related to the weight of the material on the conveyor; the other input receives a voltage having an amplitude related to the desired hourly weight of material to be fed by the conveyor means, i.e., reference data.

Immediately with the start of the reverse or down counting operation, i.e., in response to the pulse indicating the trailing edge of the section, the cutting device is activated for cutting via control circuit 7. This same pulse lowers gate 8 into its lowered position. Accordingly, the gate new controls, depending upon the duration of the down counting of the counter 13, the instantaneous spacing between the strip sections. When the counter has counted down to zero it sends a signal to control circuit 7 to restart the operation. The following regulating conditions may occur:

a. The load on the conveyor band of the weighing device may correspond to the reference data. The counter 13 will count up or forward and down or reverse in accordance with the base frequency, i.e., the spacing of the strip or band sections is adapted to the length of the sections by means of flow passage gate 8.

b. The load on the conveyor band of the weighing machine is less than the reference data. The counter counts forward at the base frequency but in reverse with a higher frequency, i.e., the spacing between the strip or band sections is reduced by means of the gate in relation to the length of the strip or band sections.

c. The load on the conveyor band of the weighing device is greater than the reference data. The counter counts forward at the base frequency but counts down at a lower frequency to increase the spacing between the band or strip sections.

As is apparent, since the velocity of the conveyor band is constant, and up counting is at a fixed rate, the length of the sections remains constant. Only the space between sections changes. Accordingly, the device of the invention produces for all regulating conditions an automatic uniform metering as to weight for a continuous feed of material to the screw extruder.

Figure 2:
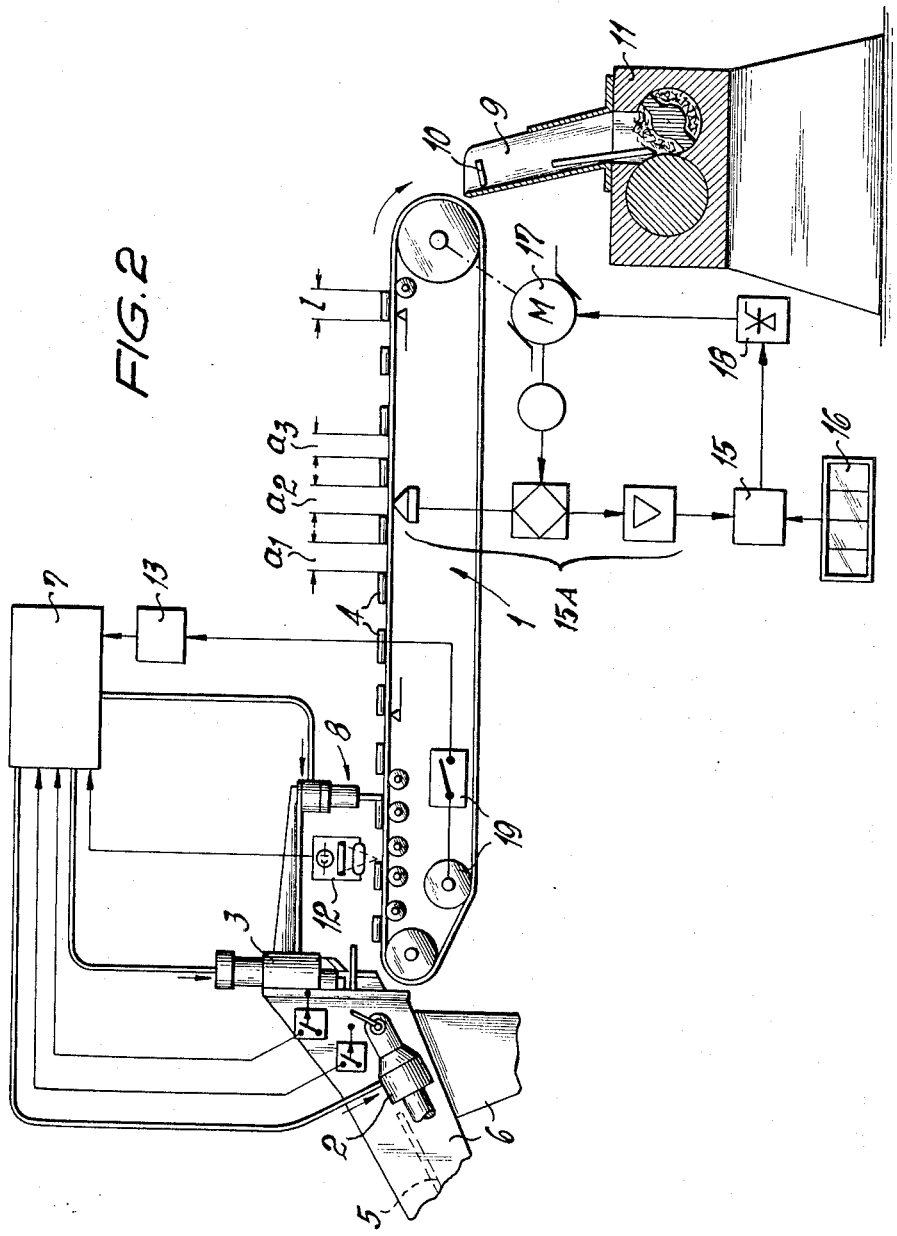
FIG. 2 shows a weighing device according to the invention, except that the metering of the strip sections is effected by varying the velocity of the conveying band while maintaining uniform the spacing of the strip sections.

In addition, the device of the invention also permits a uniform metering of the strip or band sections in a fully satisfactory manner by controlled changes in the velocity of the conveyor band of the weighing device as is shown in FIG. 2. Control by changing the conveyor band velocity has the advantage of a uniform loading of the conveyor band with strip or band sections.

The regulation of the load fed from the conveyor band by varying the velocity of the band is effected by correspondingly controlling a drive motor 17 for the conveyor band of the weighing device via voltage difference detector 15 and servo control 18 of conventional design.

By way of example, assume that counter 13 is pulsed every given fixed increment of travel distance of the conveyor band by a pulse sender 19. The pulse sender can be a toothed pulley coactive with a cam-operated switch which closes and opens once for each fixed increment to intermittently connect a voltage source to the pulse receiving inputs of the counter. Thus, the count frequency is fixed for the counter corresponding to the travel velocity of the conveyor band of the weighing device.

The length L of the band or strip sections as detected by probe 12 is registered by the counter with the set counter frequency for forward counting. The reverse counting starts, under control of probe 12 as described above for the embodiment of FIG. 1, after detecting the length of the strip at the same counter frequency, and simultaneously the flow passage gate is lowered and the cutting device 3 is given a control pulse via control circuit 7 for starting the cutting operation.

As a result, a uniform loading of the conveyor band of the weighing device is obtained since the spacing a corresponds to the length of the strip sections and is independent of the variable velocity of the conveyor band. It is merely the number of cuts which is changed with the change in the velocity of the band and thus, also, correspondinly the weight of the loading of the conveyor band.

Similarly, the controlled variation of the velocity of the conveyor band can be replaced by a metering of the strip of band sections also via a control of the feed device 2. The result of such control of device 2 is a change in the length of the strip or band sections, again correspondingly the weight of the load on the weighing device.

The feed opening of the screw extruder permits free passage of band or strip sections only up to a limited width. Hence, it is necessary, or at least advantageous, to rotate the band or strip sections before reaching the feed opening by suitable means so that they reach the feed opening with one of their short edges first. To limit the width of the strips or bands and yet to obtain an optimal loading of the weighing devices, it may also be advantageous to dispose the band or strip sections in pairs on the conveyor band of the weighing device. Such paired arrangement of the sections can be readily obtained by equipping the cutting device with a separating device of conventional design (such separating device is not shown). This separating device divides the strip along its length, preferably along the lengthwise center line of the strip in accordance with the wiedth of the conveyor band of the weighing devices. As a result, two lines of strip or band sections are conveyed on the conveyor band of the weighing device. It is advantageous to obtain a particularly uniform distribution of the weight on the surface of the conveyor band as such a uniform weight distribution assures a uniform loading. As is evident, the electronic testing device and the passage control gate must also be provided as pairs when two lines of strips are simultaneously conveyed.

Figure 3:
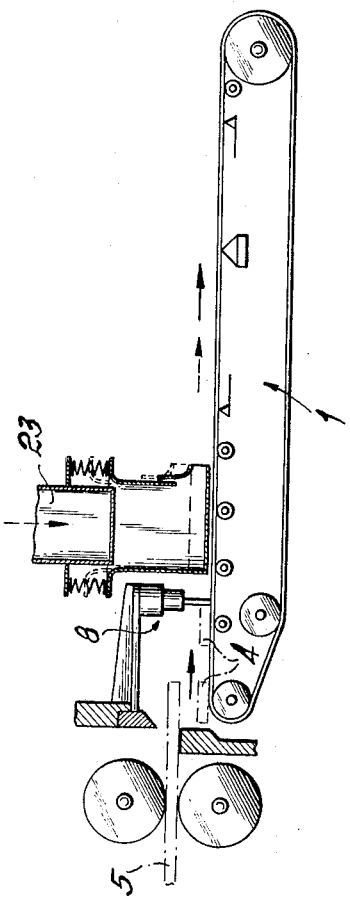
FIG. 3 shows a weighing device according either to FIG. 1 or FIG. 2 combined with a feeding device for feeding pellets or similarly shaped particles.

FIG. 3 shows a combined arrangement of the metering and the feeding system. Such combined arrangement permits feeding to the conveying type weighing device the rubber base mixture in the form of strip or band sections with pellets or granules of additives being volumetrically metered. The regulation of the passage by weight for the rubber base mixture in band or strip sections and pellets can then be effected with freely selected distribution of the percentages at the velocity of the conveying band.

In all cases, it is made possible to charge a mixture which is continuously being made uniformly and accurately with the required proportions by weight of the materials, the specific shape or consistency of the individual components being without significance.

While the invention has been described in detail with respect to certain new preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. Apparatus for controllably and uniformly feeding from the output of a source of an endless strip of material, according to weight requirements, sections of strips of the material to the input of a material utilization device comprising a continuously moving conveyor band from said source to the input of said device, controllably operable cutting means for cutting the endless strip adjacent the output of the source, indicator means for indicating the length of each section, controllably operated gating means for preventing the passage of a section along said conveyor band, measuring means for measuring the weight of the sections on said conveyor band and pulse counter means responsive to said indicator means and said measuring means for counting a number of pulses related to the length of a section for activating said cutting means to cut the endless strip and for activating said gating means to block the passage of a section on said conveyor band for a period of time related to the weight being measured by said measuring means to control the space between sections.

2. The apparatus of claim 1 wherein said indicator means comprises means for indicating the beginning and end of a section of material moving along said conveyor band and said pulse counter means includes a counter and a source of first pulses of a given fixed repetition rate, said indicator means controlling said counter to count the number of said first pulses from said source of pulses which occur between the indications of the beginning and end of said section and said measuring means including means for generating second pulses having a frequency related to the difference between a desired weight and the actual weight measured by said measuring means, and means for causing said counter to count an equivalent number of said second pulses such that said cutting means and said gating means operate during the period of time said second pulses are counted.

3. The apparatus of claim 1 wherein said indicator means comprises means for indicating the beginning and end of a section of material moving along said conveyor band, said pulse counter means includes a reversible counter which counts in a forward direction in response to the indication of the beginning of a section and which counts in a reverse direction in response to the indicator of the end of a section, a pulse generator connected to said conveyor band for generating a pulse for each given increment of travel of said conveyor band, and said measuring means including means for controlling the velocity of travel of said conveyor band in accordance with the difference between a desired weight and the actual weight measured by said measuring means.

4. The apparatus of claim 1 further comprising means for controlling the feed rate from the source of material.

5. The apparatus of claim 1 further comprising a source of additives downstream of said gating means.

6. The apparatus of claim 1 wherein said gating means comprises two blocking bars disposed vertical to the surface of the conveying band, and said indicator means is freely insertable between said bars.

7. The apparatus of claim 6 wherein said blocking bars are operable by means of a pneumatically operated cylinder.

* * * * *